(12) United States Patent
Nishiyashiki (10) Patent No.: US 8,033,718 B2
(45) Date of Patent: Oct. 11, 2011

(54) TEMPERATURE DETECTOR

(75) Inventor: Yoshinori Nishiyashiki, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 314 days.

(21) Appl. No.: 12/477,539

(22) Filed: Jun. 3, 2009

(65) Prior Publication Data

US 2009/0296782 A1    Dec. 3, 2009

(30) Foreign Application Priority Data

Jun. 3, 2008  (JP) ................................. 2008-145286

(51) Int. Cl.
*G01K 1/14* (2006.01)
(52) U.S. Cl. ........ 374/141; 374/208; 374/145; 374/148; 165/11.1
(58) Field of Classification Search .................. 374/135, 374/138, 141, 145, 147, 148, 158, 208, 209, 374/E1.011, E1.018, E1.019; 165/11.1
See application file for complete search history.

(56) References Cited

U.S. PATENT DOCUMENTS

| | | | |
|---|---|---|---|
| 6,328,468 B1 * | 12/2001 | Nagano et al. | 374/141 |
| 7,153,024 B2 * | 12/2006 | Usui | 374/208 |
| 2006/0162350 A1 | 7/2006 | Shiraishi et al. | |
| 2006/0165154 A1 * | 7/2006 | Usui | 374/208 |
| 2008/0035307 A1 * | 2/2008 | Yamakawa | 165/65 |

FOREIGN PATENT DOCUMENTS

| | | | |
|---|---|---|---|
| DE | 19917066 A1 * | 10/2000 | |
| JP | 2006-17406 | 1/2006 | |
| JP | 2006-232257 | 9/2006 | |

* cited by examiner

*Primary Examiner* — Amy Cohen Johnson
(74) *Attorney, Agent, or Firm* — Nelson Mullins Riley & Scarborough LLP; Anthony A. Laurentano (57) ABSTRACT

A temperature detector for measuring temperature of a heat exchanger of a vehicular air-conditioning unit includes a holder holding temperature measuring means for measuring the temperature of the exchanger and a harness connected to the measuring means. The holder has a through hole through which a measuring section of the measuring means extends, and first and second grip parts through which the harness extends. The first grip part has such a width dimension that the harness having a width dimension in the horizontal direction can be inserted therethrough, and the second grip part has such a width dimension that the harness having the width dimension in the vertical direction can be inserted therethrough and that the harness having the width dimension in the horizontal direction can not be inserted therethrough. Accordingly, a portion of the harness between the first and second grip parts is twisted and held by the holder.

8 Claims, 6 Drawing Sheets

TEMPERATURE DETECTOR

BACKGROUND OF THE INVENTION

1. Field of the Invention

The present invention relates to a temperature detector for measuring the temperature of a heat exchanger of a vehicular air-conditioning unit.

2. Description of the Related Art

Vehicular air-conditioning units include an evaporator (cooling heat exchanger) for cooling outside air delivered from a blower unit. The outside air is cooled by a heat exchange with a coolant which flows in the evaporator. After the outside air is cooled, part of the cooled outside air is brought into contact with a heater and heated thereby. The heated outside air is then mixed with the remaining cooled outside air which has passed through a bypass passage without contacting the heater. The mixed air is then introduced as conditioned air at a desired temperature from air outlets into the passenger compartment of the vehicle.

The rate at which the cooled outside air is supplied to the heater or bypass passage is adjusted by the opening of a door member of a damper mechanism which is disposed near the evaporator.

A temperature detector has a temperature detecting tip end held against the evaporator at a given position (see, for example, Japanese Laid-Open Patent Publication No. 2006-017406 and Japanese Laid-Open Patent Publication No. 2006-232257). The temperature detector detects the temperature of the evaporator, and a temperature control mechanism, not shown, controls the temperature of the coolant which flows in the evaporator to stay within a predetermined range based on the detected temperature.

The temperature detector is retained on the evaporator by a holder. The holder has an insertion protrusion which is inserted in and engaged by fins of the evaporator, thereby holding the holder on the evaporator.

As shown in FIG. 14 of Japanese Laid-Open Patent Publication No. 2006-017406 and FIG. 7 of Japanese Laid-Open Patent Publication No. 2006-232257, a harness (leads) is connected to an end of the temperature detector. As described above, the evaporator is supplied with outside air from the blower unit. Therefore, if the harness is loose, then the harness tends to vibrate under the pressure of the outside air which is applied to the harness. The harness is liable to vibrate more as the length of the harness connected to the temperature detector is larger as shown in FIG. 14 of Japanese Laid-Open Patent Publication No. 2006-017406.

When the largely-vibrating harness hits the evaporator and the damper mechanism, it produces noise. If the harness is entangled with the damper mechanism, then the door member of the damper mechanism may possibly be prevented from achieving a desired opening or may possibly cut off the harness when the door member is opened and closed.

One solution would be to reduce the length of the harness connected to the temperature detector for reducing the vibration of the harness. However, the shorter harness would make the temperature detector unable to measure the temperature of a central region of the evaporator.

SUMMARY OF THE INVENTION

It is a general object of the present invention to provide a temperature detector which makes it possible to reduce the vibration of a harness connected thereto even if the harness extends a long distance.

A major object of the present invention is to provide a temperature detector which prevents a harness connected thereto from contacting an evaporator and a damper mechanism.

According to the present invention, there is provided a temperature detector for measuring the temperature of a heat exchanger of a vehicular air-conditioning unit, comprising temperature measuring means for measuring the temperature of the heat exchanger, a harness connected to an end of the temperature measuring means, and a holder holding the temperature measuring means and the harness and supported by the heat exchanger. The harness has a height dimension and a width dimension which is greater than the height dimension. The holder has a through hole through which a measuring section of the temperature measuring means extends and a first grip part and a second grip part through which the harness extends. The first grip part is disposed near the through hole and has such a width dimension that a portion of the harness having the width dimension in the horizontal direction can be inserted through the first grip part, and the second grip part has such a width dimension that a portion of the harness having the width dimension in the vertical direction can be inserted through the second grip part and that the portion of the harness having the width dimension in the horizontal direction cannot be inserted through the second grip part. The portion of the harness having the width dimension in the horizontal direction is inserted through the first grip part, the portion of the harness having the width dimension in the vertical direction is inserted through the second grip part, and a portion of the harness between the first grip part and the second grip part is held by the holder while being twisted.

The harness is connected to the end of the temperature measuring means while having a width dimension in the horizontal direction, i.e., lying horizontally. The portion of the harness between the first grip part and the second grip part is twisted and then has the width dimension in the vertical direction (i.e., lying vertically). The portion of the harness having the width dimension in the vertical direction is inserted into the second grip part and projects out of the holder. Since the harness extending outwardly from the holder has its height dimension in a direction parallel to the plane of the evaporator, the harness has a relatively small area of contact with outside air impinging on the harness. Thus, pressure from the impinging outside air is reduced.

When the outside air impinges upon the harness, the harness with its width dimension along the direction of the impinging outside air exhibits greater rigidity against the impinging outside air, compared to the case where the harness has its height dimension along the direction of the impinging outside air. This is because the dimension (width dimension) along the direction of the impinging outside air is greater than the dimension (height dimension) along the direction perpendicular to the direction of the impinging outside air.

Consequently, the harness is effectively prevented from vibrating under the forces of the impinging outside air. Since the portion of the harness which extends out of the holder has its width dimension along the direction of the impinging outside air, the vibration of the harness which is caused by the impinging outside air is minimized even if the portion of the harness which extends out of the holder is long. As a result, the harness is prevented from contacting the evaporator and a damper mechanism which is disposed near the evaporator. The harness produces no noise, does not obstruct opening and closing movement of the door member of the damper mechanism, and is prevented from being cut off when the door member is opened and closed.

The holder may include an openable and closable lid, and the second grip part may be provided by the openable and closable lid.

The holder may include a third grip part disposed between the first grip part and the second grip part, and the third grip part may have such a dimension that the portion of the harness having the width dimension in the horizontal direction can be inserted through the third grip part. The harness inserted in and gripped by the third grip part is securely held by the holder.

The temperature detector may also include a gripper holding the harness and supported by the heat exchanger. The gripper may have an elliptical through hole having an elliptical cross-sectional shape, and the harness may be inserted through the elliptical through hole. The elliptical through hole may have a longer diameter in the vertical direction, and the longer diameter has such a dimension that the portion of the harness having the width dimension in the vertical direction can be inserted through the elliptical through hole and that the portion of the harness having the width dimension in the horizontal direction cannot be inserted through the elliptical through hole. In this case, the harness inserted in and gripped by the gripper may keep its height dimension parallel to the plane of the evaporator between the holder and the gripper. Accordingly, the harness which extends over the evaporator between the holder and the gripper is subject to lower pressure from the impinging outside air, and remains highly rigid against the impinging outside air. The harness is thus effectively prevented from vibrating under the force of the impinging outside air.

Further, the harness between the holder and the gripper may be pulled under as high tensile forces as possible so that the harness will not loosen between the holder and the gripper. The harness is thus more effectively prevented from vibrating under the force of the impinging outside air.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Temperature detectors according to preferred embodiments of the present invention will be described in detail below with reference to the accompanying drawings.

Figure 1:
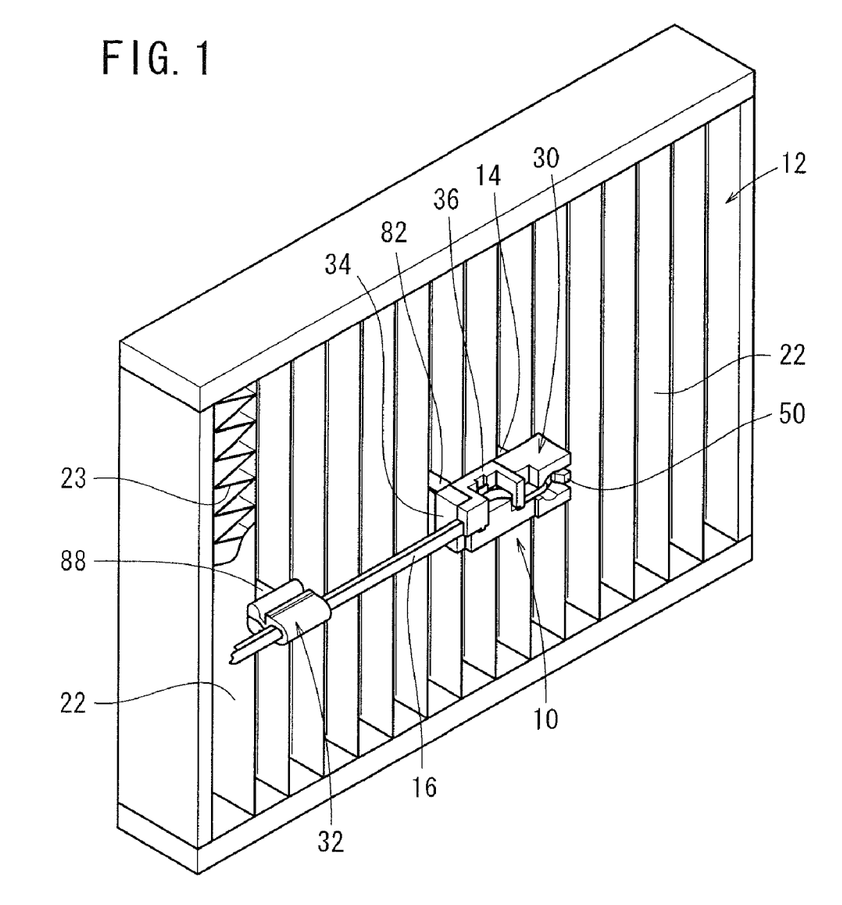
FIG. 1 is a perspective view of an evaporator (heat exchanger) on which a temperature detector according to an embodiment of the present invention is mounted.

FIG. 1 shows in perspective an evaporator 12 (heat exchanger) on which a temperature detector 10 according to an embodiment of the present invention is mounted. The evaporator 12 serves as part of a vehicular air-conditioning unit, not shown. The evaporator 12 cools outside air delivered from a blower unit, not shown. As shown in FIG. 1, the temperature detector 10 includes a tubular member 14 (see also FIG. 2) of metal housing therein a thermistor as a temperature measuring means therein. The tubular member 14 is mounted substantially centrally on the evaporator 12. A harness 16 connected to the thermistor and functioning as leads projects from an end of the tubular member 14.

Figure 2:
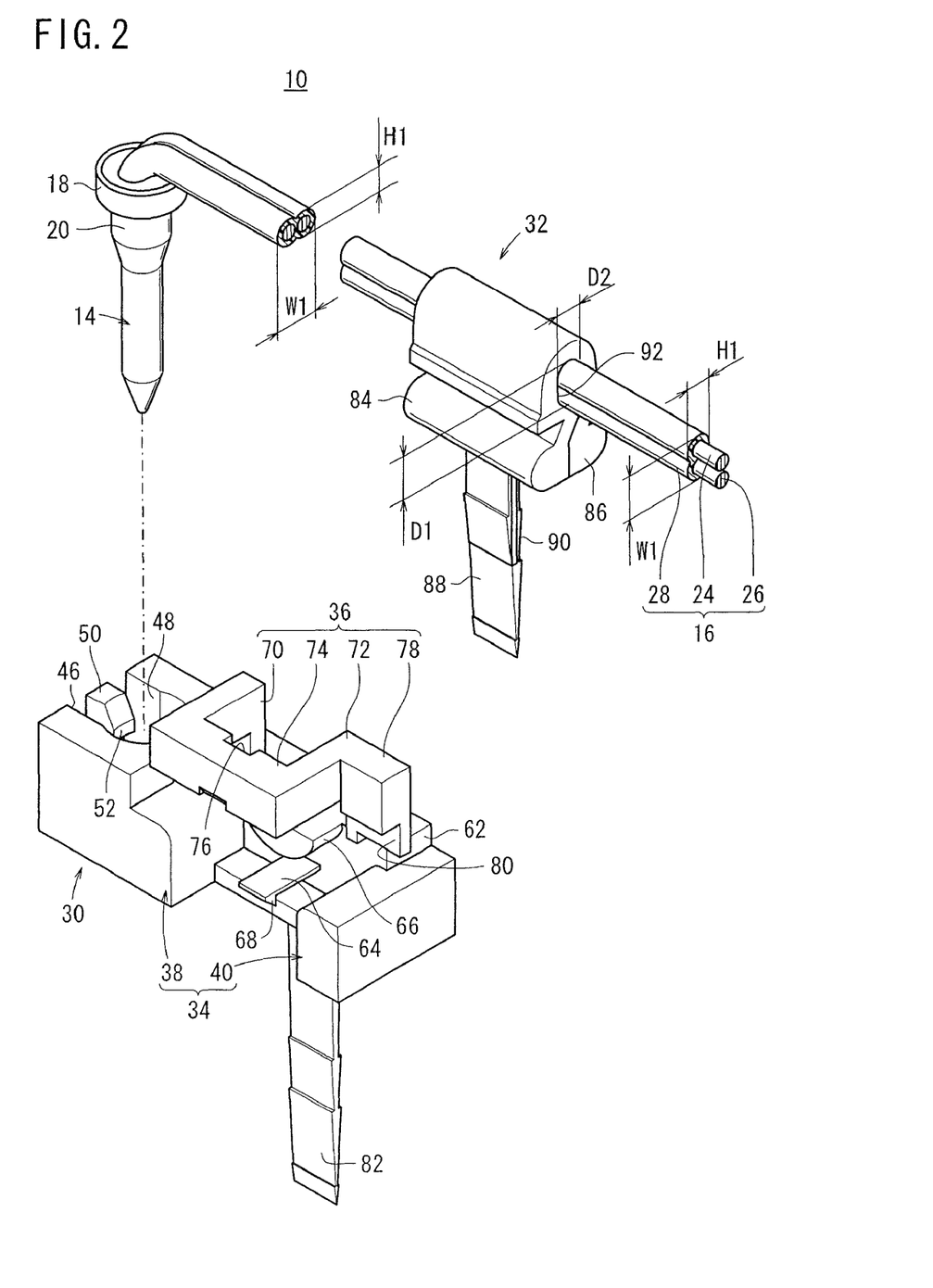
FIG. 2 is an exploded perspective view, partly cut away, of the temperature detector according to the embodiment of the present invention.
Figure 3:
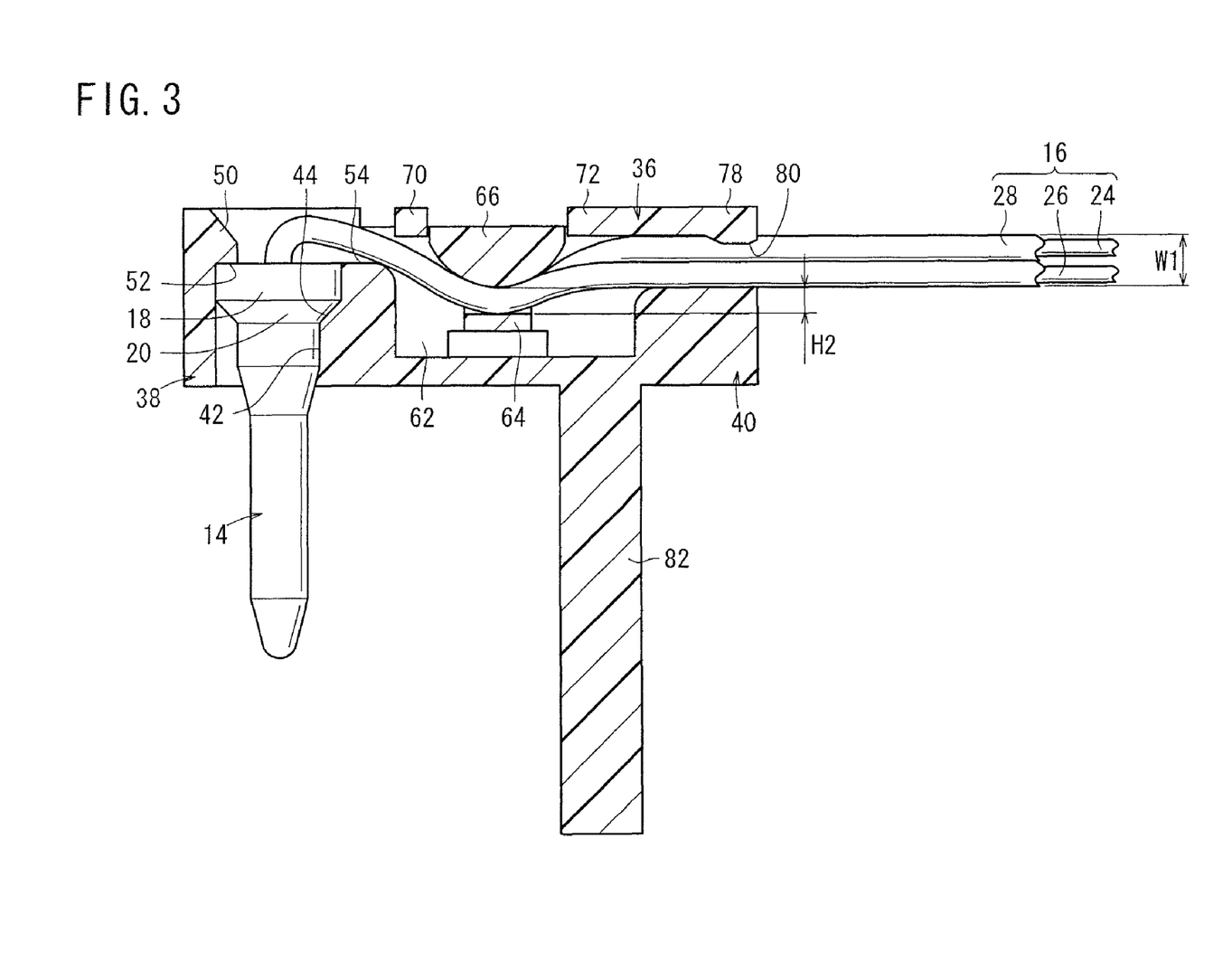
FIG. 3 is a longitudinal vertical cross-sectional view of a holder of the temperature detector according to the embodiment of the present invention.

As shown in FIGS. 2 and 3, the tubular member 14 is in the form of an elongate pin having a tapered pointed end and an opposite disk-shaped end 18 disposed adjacent to a tapered small-diameter portion 20. The pointed end of the tubular member 14 is held against a tube 22 (see FIG. 1) of the evaporator 12. The tubular member 14 is held by a corrugated fin 23 disposed between adjacent tubes 22. In FIG. 1, the corrugated fin 23 is only partly illustrated.

As described above, the harness 16 projects from the disk-shaped end 18 of the tubular member 14. As shown in FIG. 2, the harness 16 comprises a supply lead 24 through which a current flows from a detection control circuit (not shown) to the thermistor, and a return lead 26 through which a current flows from the thermistor to the detection control circuit, the supply and return leads 24, 26 being covered with an insulating cover 28.

The supply and return leads 24, 26 extend parallel to each other in the harness 16. When the supply and return leads 24, 26 extend horizontally parallel to each other as shown in FIG. 2, the harness 16 has a width dimension W1 in a horizontal direction and a height dimension H1 in a vertical direction. As shown in FIG. 2, the width dimension W1 is greater than the height dimension H1.

Figure 4:
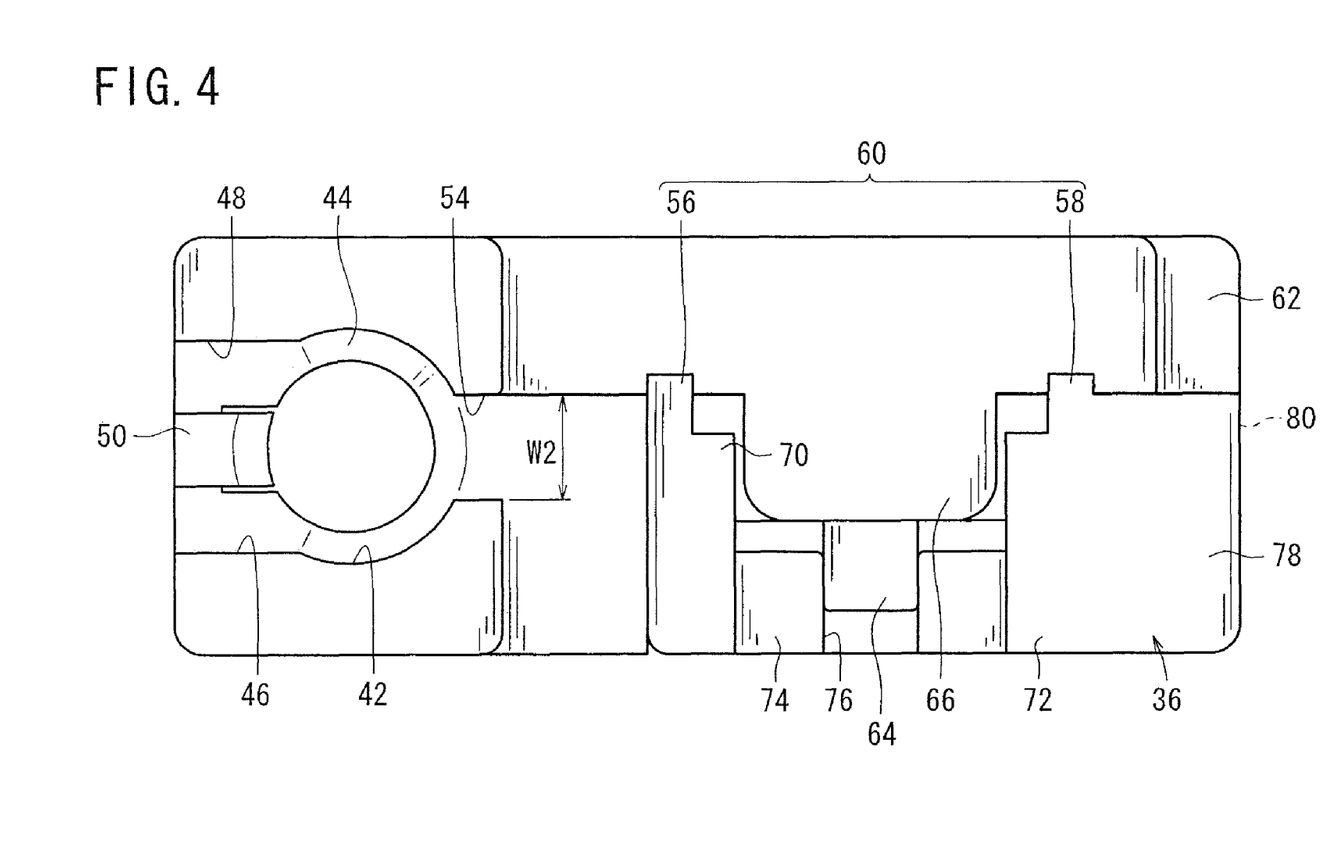
FIG. 4 is a plan view of the holder shown in FIG. 3.
Figure 5:
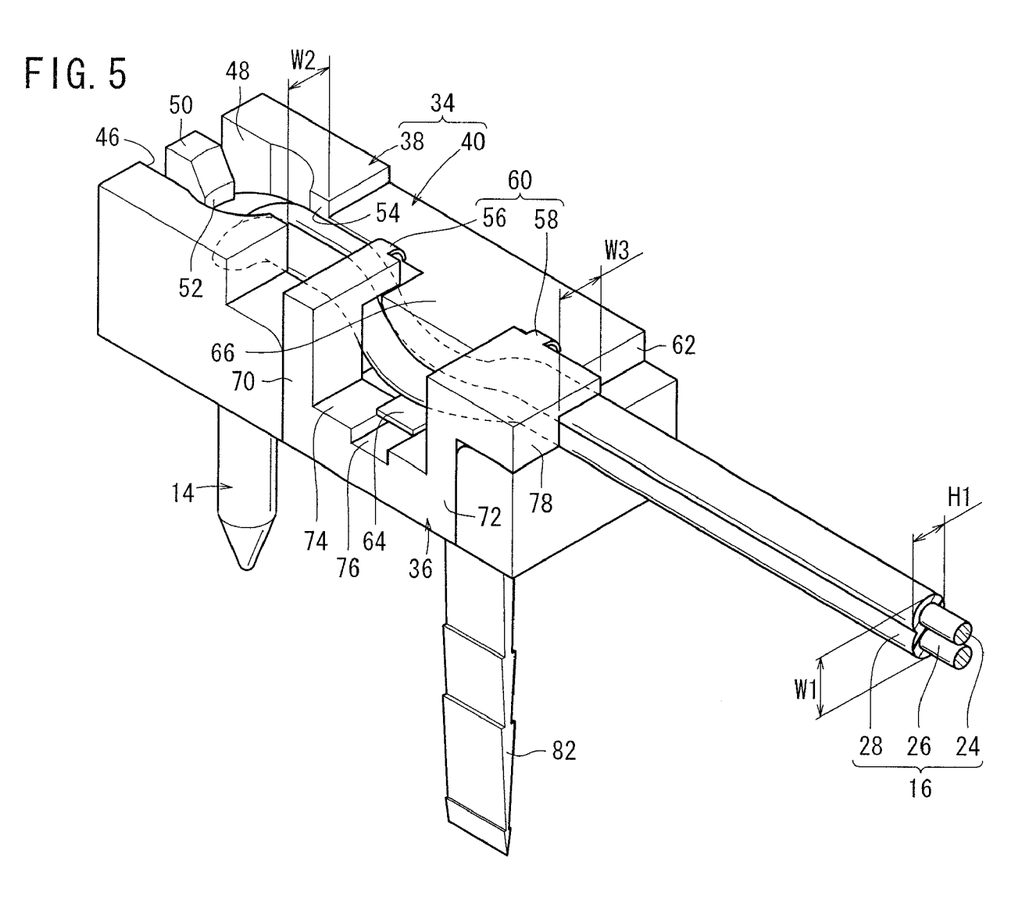
FIG. 5 is a perspective view of the holder which holds a thermistor and a tubular member.

The temperature detector 10 also includes a holder 30 and a clip (gripper) 32 spaced from the holder 30 and mounted on a fin 23 of the evaporator 12. As shown in FIGS. 2, 4, and 5, the holder 30 comprises a main body 34 and a lid 36 integrally formed with the main body 34 and joined to the main body 34 with an end of the lid 36 being detachable from the main body 34. The holder 30 and the clip 32 are made of a resin material.

The main body 34 comprises a first retainer 38 for retaining the thermistor therein and a second retainer 40 for retaining the harness 16 which projects from the disk-shaped end 18 of the tubular member 14.

The first retainer 38, which is of a substantially cubic shape, has a through hole 42 defined therein for inserting the tubular member 14 (see FIGS. 3 and 4). An inner wall surface of the through hole 42 includes a tapered wall surface 44 corresponding in shape to the tapered small-diameter portion 20 of the tubular member 14. When the tubular member 14 is inserted into the through hole 42, the tapered small-diameter portion 20 is snugly seated on the tapered wall surface 44, thereby catching the disk-shaped end 18 in the tapered wall surface 44. Thus, the tubular member 14 is prevented from slipping through the through hole 42.

The first retainer 38 has two grooves 46, 48 defined therein which extend from an outer wall surface of the distal end of the first retainer 38 to the inner wall surface of the through hole 42 (see FIGS. 2, 4, and 5), with a flexible tooth 50 being left between the grooves 46, 48 in the distal end of the first retainer 38. The flexible tooth 50 has a hook 52 on its distal end which abuts against an upper end surface of the disk-shaped end 18 of the tubular member 14 to secure the tubular member 14, and hence the thermistor, in position (see FIG. 3).

As shown in FIGS. 3 and 5, the first retainer 38 has a grip passage 54 defined in an end thereof which is joined to the second retainer 40 for passing the harness 16 therethrough. The grip passage 54 serves as a first grip part for gripping the harness 16 therein.

The grip passage 54 has a width dimension W2 (see FIGS. 4 and 5) which is substantially the same as the width dimension W1 of the harness 16. When the harness 16 has the width dimension W1 in the horizontal direction, i.e., when the harness 16 lies horizontally in FIG. 3, the harness 16 can be inserted through the grip passage 54.

The second retainer 40, which is slightly longer than the first retainer 38, has an opening in one side thereof (see FIG. 2). The opening is selectively closed by the lid 36 (see FIGS. 4 and 5). The lid 36 is openably and closably connected to the second retainer 40 by a hinge mechanism 60 (see FIG. 5). The hinge mechanism 60 comprises a first joint 56 and a second joint 58 which extend from the lid 36 to the second retainer 40 and which are flexible because they are narrow and thin.

The second retainer 40 has a wall 62 on the opposite side thereof. A lower arm 64 and an upper arm 66 which face each other project from the wall 62 into the opening. The lower arm 64 and the upper arm 66 are oriented substantially perpendicularly to the longitudinal axis of the second retainer 40 and extend parallel to each other. The lower arm 64 has a hook 68 directed downwardly in FIG. 2.

The lower arm 64 and the upper arm 66 are spaced from each other by a clearance having a dimension H2 (see FIG. 3) which is substantially the same as the height dimension H1 of the harness 16. When the harness 16 which lies horizontally in FIG. 3 can be inserted through the clearance. However, when the harness 16 has the width dimension W1 in the vertical direction, i.e., when the harness 16 lies vertically in FIG. 3, the harness 16 cannot be inserted through the clearance.

The lid 36 comprises a first L-shaped member 70 and a second L-shaped member 72 which are movably joined to the second retainer 40 respectively by the first joint 56 and the second joint 58, and a bridge 74 extending between the distal ends of the first L-shaped member 70 and the second L-shaped member 72. The bridge 74 has a locking slot 76 for receiving therein the hook 68 of the lower arm 64. The locking slot 76 has a perpendicular wall (not shown) extending perpendicularly from the bottom surface of the locking slot 76. When the lid 36 is closed on the second retainer 40, i.e., when the lid 36 is put into the opening in the second retainer 40, the distal end of the lower arm 64, which includes the hook 68, flexes and moves over the perpendicular wall. When an end face of the bridge 74 is seated in the second retainer 40, i.e., when the bridge 74 is disposed in the opening in the second retainer 40 in place, the hook 68 is locked by the perpendicular wall. The lid 36 is now securely positioned in the opening, closing the opening.

The second L-shaped member 72 has a ledge 78 extending along the longitudinal axis of the second retainer 40. The ledge 78 includes a step 80 formed by partly reducing the thickness of the ledge 78. When the lid 36 closes the opening, a clearance is formed between the step 80 and a rear end of the second retainer 40 which is remote from the first retainer 38. The clearance serves as a second grip part for gripping the harness 16.

The clearance has a width dimension W3 (see FIG. 5) which is substantially the same as the height dimension H1 of the harness 16. When the harness 16 lies vertically in FIG. 5, the harness 16 can be inserted through the clearance. However, when the harness 16 lies horizontally, it cannot be inserted through the clearance.

An insertion protrusion 82 projects from the rear end of the second retainer 40. The insertion protrusion 82 is longer than the tubular member 14. The insertion protrusion 82 serves to be inserted into a fin 23 of the evaporator 12.

The lower arm 64 and the upper arm 66 jointly function as a third grip part for gripping the harness 16 placed between the grip passage 54 and the step 80.

As shown in FIG. 2, the clip 32 comprises a first grip lid 84 and a second grip lid 86, which are relatively wide, and a pair of insertion protrusions 88, 90 projecting from respective lower ends of the first grip lid 84 and the second grip lid 86. The insertion protrusions 88, 90 also serve to be inserted into a fin 23 of the evaporator 12.

The first grip lid 84 and the second grip lid 86 are joined to each other only at their upper ends, and can be displaced toward and away from each other about their upper ends. Stated otherwise, the first grip lid 84 and the second grip lid 86 can be selectively opened and closed by the worker who installs the temperature detector 10.

The first grip lid 84 and the second grip lid 86 have respective recesses defined therein near their upper ends, the recesses being open toward each other. When the first grip lid 84 and the second grip lid 86 are closed (displaced toward each other), their recesses are combined into an elliptical through hole 92 having an elliptical cross-sectional shape. The harness 16 is inserted through the elliptical through hole 92.

The elliptical through hole 92 has a longer diameter D1 in the vertical direction in FIG. 2 and a shorter diameter D2 in the horizontal direction in FIG. 2. The longer diameter D1 is substantially the same as the width dimension W1 of the harness 16, and the shorter diameter D2 is substantially the same as the height dimension H1 of the harness 16. Therefore, the harness 16 which lies vertically in FIG. 2 is inserted through the elliptical through hole 92.

As described above, the harness 16 lies horizontally in a portion thereof which extends from the disk-shaped end 18 of the tubular member 14 through the grip passage 54 to the position where the harness 16 is gripped between the lower arm 64 and the upper arm 66. The harness 16 is twisted through about 90° in a portion thereof between the position where the harness 16 is gripped between the lower arm 64 and the upper arm 66 and the step 80. The harness 16 lies vertically in a portion thereof which extends through the clearance between the step 80 and the rear end of the second retainer 40 out of the second retainer 40. The harness 16 also lies vertically in a portion thereof which is held by the clip 32. The portion of the harness 16 which extends between the holder 30 and the clip 32 is pulled under as high tensile forces as possible so that the harness 16 will not loosen between the holder 30 and the clip 32.

The temperature detector 10 according to the present embodiment is basically constructed as described above. Operation and advantages of the temperature detector 10 will be described below.

When the vehicular air-conditioning unit is activated, the blower unit is operated to supply outside air to the evaporator 12.

The supplied outside air is brought into contact with the harness 16 which is placed on the evaporator 12. According to the present embodiment, the harness 16 is kept taut between the holder 30 and the clip 32 on the evaporator 12, and will not loosen therebetween. Furthermore, since the harness 16 has the height dimension H1 parallel to the plane of the evaporator 12 between the holder 30 and the clip 32, the harness 16 has a relatively small area of contact with the incoming outside air. When the incoming outside air impinges upon the harness 16, the harness 16 whose supply and return leads 24, 26 are arrayed along the direction of the impinging outside air exhibits greater rigidity against the impinging outside air, compared to the case where the supply and return leads 24, 26 are arrayed along a direction perpendicular to the direction of the impinging outside air. This is because the width dimension W1 along the direction of the impinging outside air is greater than the height dimension H1 along the direction perpendicular to the direction of the impinging outside air.

Consequently, the harness 16 is effectively prevented from vibrating under the forces of the impinging outside air. According to the present embodiment, since the portion of the harness 16 which extends out of the holder 30 has the width dimension W1 along the direction of the impinging outside air, the vibration of the harness 16 which is caused by the impinging outside air is minimized even if the portion of the harness 16 which extends out of the holder 30 is long.

As a result, the harness 16 is prevented from contacting the evaporator 12 and a damper mechanism which is disposed near the evaporator 12, and noise is thus prevented from generating. Inasmuch as the harness 16 is also prevented from being entangled with the damper mechanism, the door member of the damper mechanism can achieve a desired opening and is prevented from cutting off the harness 16 when the door member is opened and closed.

In the above illustrated embodiment, the harness 16 is gripped by the third grip part made up of the lower arm 64 and the upper arm 66 between the grip passage 54 (the first grip part) and the clearance (the second grip part) provided by the step 80. However, the third grip part may be dispensed with.

Figure 6:
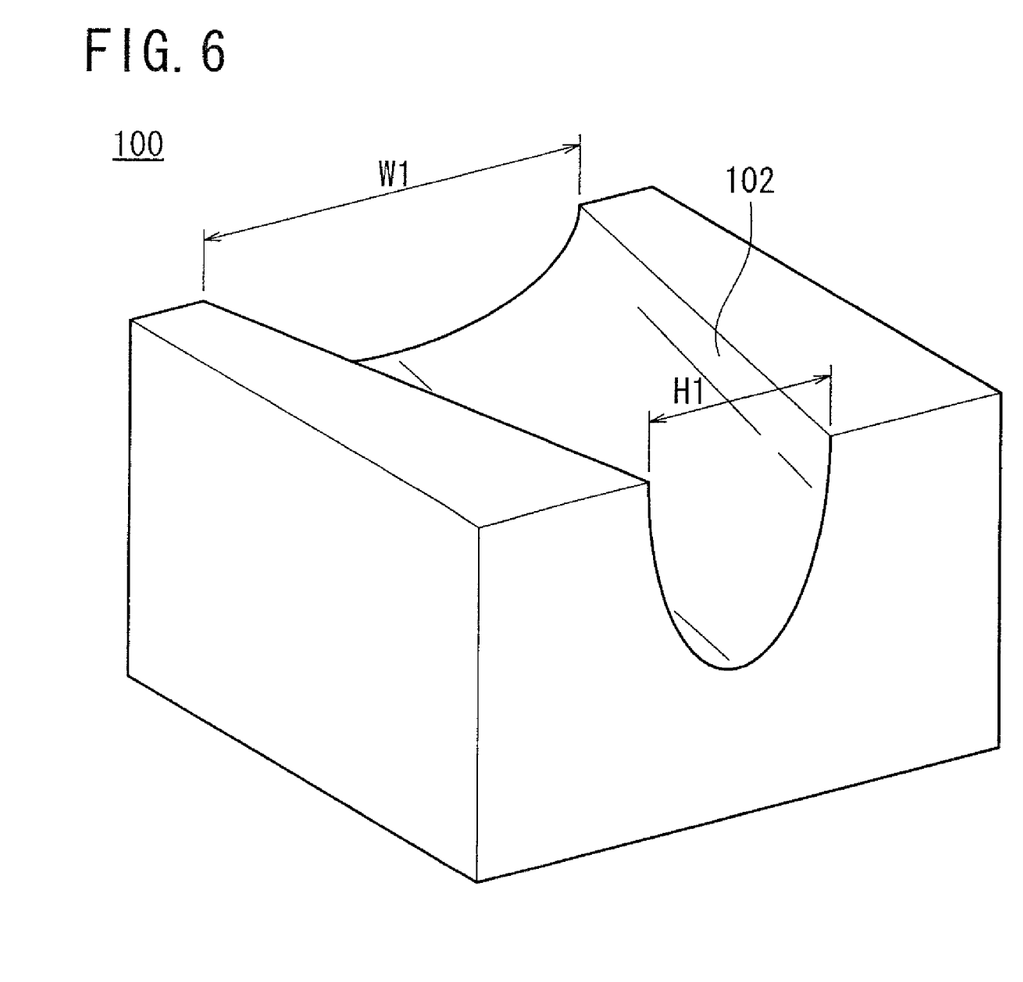
FIG. 6 is a perspective view of a main body of a holder according to another embodiment of the present invention.

The lid 36 may also be dispensed with. FIG. 6 shows in perspective a main body 100 of a holder according to another embodiment of the present invention. As shown in FIG. 6, the main body 100 has a groove 102 defined therein which has an end having a width that is substantially the same as the width dimension W1 of the harness 16 for receiving the harness 16 which lies horizontally in FIG. 6, and an opposite end having a width that is substantially the same as the height dimension H1 of the harness 16 for receiving the harness 16 which lies vertically in FIG. 6. The main body 100 has an upper end where the groove 102 is open, which is closed by a closure, not shown. The end of the groove 102 which has the width that is substantially the same as the width dimension W1 corresponds to the first grip part, and the opposite end of the groove 102 which has the width that is substantially the same as the height dimension H1 corresponds to the second grip part.

The principles of the present invention are also applicable to a temperature detector where the length of the portion of the harness 16 which extends out of the holder 30 is relatively small.

Although certain preferred embodiments of the present invention have been shown and described in detail, it should be understood that various changes and modifications may be made therein without departing from the scope of the appended claims.

What is claimed is:

1. A temperature detector for measuring the temperature of a heat exchanger of a vehicular air-conditioning unit, comprising:
    temperature measuring means for measuring the temperature of the heat exchanger;
    a harness connected to an end of the temperature measuring means; and
    a holder holding the temperature measuring means and the harness and supported by the heat exchanger;
    wherein the harness has a height dimension and a width dimension which is greater than the height dimension;
    the holder has a through hole through which a measuring section of the temperature measuring means extends and a first grip part and a second grip part through which the harness extends;
    the first grip part is disposed near the through hole and has such a width dimension that a portion of the harness having the width dimension in the horizontal direction can be inserted through the first grip part, and the second grip part has such a width dimension that a portion of the harness having the width dimension in the vertical direction can be inserted through the second grip part and that the portion of the harness having the width dimension in the horizontal direction cannot be inserted through the second grip part; and
    the portion of the harness having the width dimension in the horizontal direction is inserted through the first grip part, the portion of the harness having the width dimension in the vertical direction is inserted through the second grip part, and a portion of the harness between the first grip part and the second grip part is held by the holder while being twisted.

2. A temperature detector according to claim 1, wherein the holder includes an openable and closable lid, the second grip part being provided by the openable and closable lid.

3. A temperature detector according to claim 1, wherein the holder includes a third grip part disposed between the first grip part and the second grip part, and the third grip part has such a dimension that the portion of the harness having the width dimension in the horizontal direction can be inserted through the third grip part.

4. A temperature detector according to claim 1, further comprising:
    a gripper holding the harness and supported by the heat exchanger, the gripper having an elliptical through hole having an elliptical cross-sectional shape, the harness being inserted through the elliptical through hole;
    wherein the elliptical through hole has a longer diameter in the vertical direction, and the longer diameter has such a dimension that the portion of the harness having the width dimension in the vertical direction can be inserted through the elliptical through hole and that the portion of the harness having the width dimension in the horizontal direction cannot be inserted through the elliptical through hole.

5. A temperature detector according to claim 1, wherein the portion of the harness between the first grip part and the second grip part is twisted substantially through 90°.

6. A temperature detector according to claim 1, wherein the harness comprises a supply lead for passing a current therethrough to the temperature measuring means and a return lead for passing a current therethrough from the temperature measuring means, the supply lead and the return lead extending parallel to each other.

7. A temperature detector according to claim 6, wherein portions of the supply lead and the return lead gripped in the first grip part are disposed parallel to each other in the horizontal direction, and portions of the supply lead and the return lead gripped in the second grip part are disposed parallel to each other in the vertical direction.

8. A temperature detector according to claim 7, wherein the supply lead and the return lead have portions twisted substantially through 90° between the first grip part and the second grip part.

* * * * *